United States Patent [19]

Matsushita

[11] Patent Number: 4,678,239

[45] Date of Patent: Jul. 7, 1987

[54] FREE WHEEL CAP

[76] Inventor: Yutaka Matsushita, 8850-2 Nishi Haruchika, Ina City, Nagano Prefecture, Japan

[21] Appl. No.: 779,267

[22] Filed: Sep. 23, 1985

[30] Foreign Application Priority Data

Sep. 27, 1984 [JP] Japan .................................. 59-202498

[51] Int. Cl.[4] ............................ B60B 7/04; B60B 7/06
[52] U.S. Cl. .................................... 301/37 N; 40/587
[58] Field of Search .............. 40/587; 301/37 R, 37 P, 301/37 CD, 37 C, 37 N

[56] References Cited

U.S. PATENT DOCUMENTS

| | | | |
|---|---|---|---|
| 2,754,154 | 7/1956 | Solow | 301/37 N X |
| 2,954,629 | 10/1960 | Matin | 40/587 |
| 3,769,729 | 11/1973 | Engler | 307/37 N |
| 4,280,293 | 7/1981 | Kovalenko et al. | 301/37 N X |
| 4,388,771 | 6/1983 | Lalonde | 301/37 N X |

FOREIGN PATENT DOCUMENTS

| | | | |
|---|---|---|---|
| 122503 | 8/1948 | Sweden | 301/37 R |
| 192621 | 1/1926 | United Kingdom | 40/587 |

Primary Examiner—David A. Scherbel
Attorney, Agent, or Firm—Murray Schaffer

[57] ABSTRACT

Accordingly, the present invention provides a hub cap assembly having a non-rotating wheel cover consisting of a disc like body on which indicia, advertising material, trademarks and the like can be placed. The cover body is provided with a weight on its back surface acting to normally maintain the cover in a given orientation and is held on an outer bracket fitted with a annular bearing at its center and radially extending spokes through which the cover body is attached. An annular bearing is located within the annular center of the outer flange and is resiliently attached to the central boss portion of an inner bracket. The inner bracket being provided with a plurality of radial stays having a V-shaped clip at its end adapted to engage with the rim portion of the wheel. The V-shaped clip is provided with a rounded tip at its extreme end which fits beneath the rim of the wheel. The cover body is thus fixed to the outer bracket and which is in turn resiliently secured to the inner bracket which is itself resiliently and removably attached the wheel. Thus, the outer bracket and the cover body is non-rotatable with the wheel, although because of its resiliency is rockable, pendulum-like while the wheel is in motion. Thus the vehicle wheel will rotate, but the cover body will not and therefore will be able to be used as a moving advertisement.

6 Claims, 8 Drawing Figures

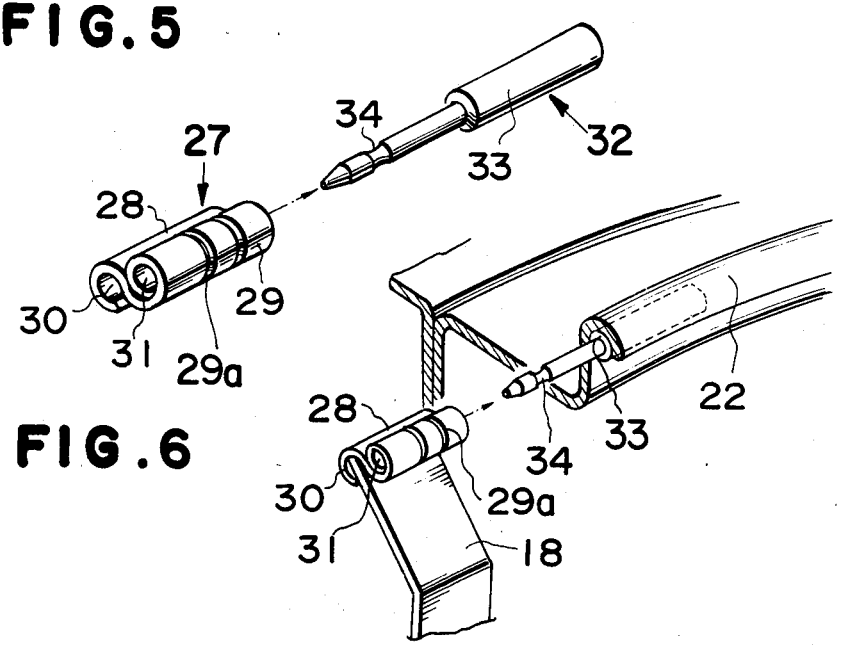
FIG. 5
FIG. 6
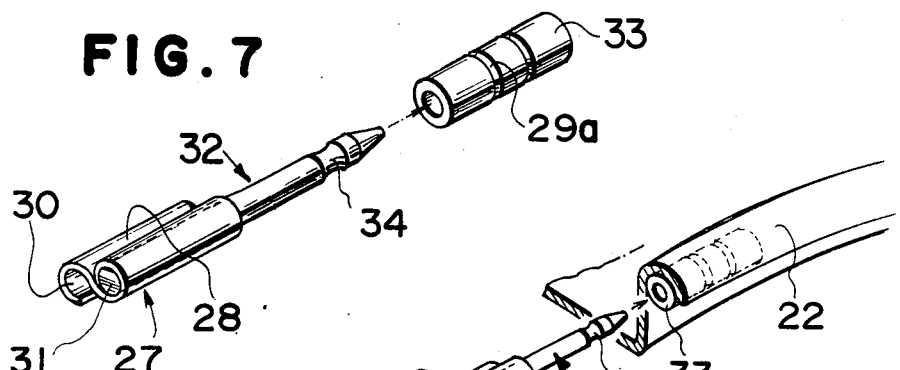
FIG. 7
FIG. 8

2

FREE WHEEL CAP

FIELD OF THE INVENTION

This invention relates to a hub cap assembly for motor vehicles, and more particularly, to a hub cap assembly having a wheel cover free of simultaneous rotation with the wheel thereby presenting a stationary surface that can be utilized for an advertisement.

BACKGROUND OF THE INVENTION

The conventional wheel cover is provided to protect the wheel and to provide a decorative accessory for the vehicle. Therefore, the contour and structure of the wheel cover is fixed and it is intended that the wheel cover be fitted and removed from the wheel in the same manner. Specifically, the wheel cover is made so that it fits very easily on the hub on the wheel so that it does not present any problem to the owner or mechanic. Consequently, when the wheel cover has been used for many years or when the wheel cover is not positively secured to the wheel, it may become accidentally separated from the wheel during operation of the vehicle, thus giving rise to traffic accidents. Furthermore, the conventional wheel cover is so fixed to the wheel that it rotates together with the wheel, therefore advertising indicia, picturizations, and other marks could not be provided on the wheel cover.

This invention has as its object the provision of its hub cap assembly having a wheel cover which can be utilized as a surface on which an advertisement or the like can be placed; an advantage unobtainable with a conventional wheel cover. Other problems to be solved by the present invention are (a) the wheel cover cannot be rotated together with the wheel; (b) the wheel cover must be capable of being simply and easily fitted and removed; (c) the wheel cover must be attached so that it cannot be accidentally removed while running.

An object of the present invention is to provide the hub cap assembly having a wheel cover which does not rotate together with the wheel.

A further object of the present invention is to provide a non-rotatable wheel cover which can be simple and easily removable from the wheel, while its accidental removal from the wheel during the running of the vehicle is prevented.

Another object of the present invention is to provide a wheel cover on which indicia, advertising and marks may be placed on its surface so that the wheel cover may be used as a moving advertisement.

SUMMARY OF THE INVENTION

Accordingly, the present invention provides a hub cap assembly having a non-rotating wheel cover consisting of a disc like body on which indicia, advertising material, trademarks and the like can be placed. The cover body is provided with a weight on its back surface acting to normally maintain the cover in a given orientation and is held on an axially outer bracket fitted with a annular bearing at its center and radially extending spokes to which the cover body is attached. An annular bearing is located within the annular center of the outer bracket and is resiliently attached to the central boss portion of an axially inner bracket. The inner bracket is provided with a plurality of radial stays having a V-shaped clip at its end adapted to engage with the rim portion of the wheel. The V-shaped clip is provided with a rounded tip at its extreme end which fits beneath the rim of the wheel. The cover body is thus fixed to the outer bracket and which is in turn resiliently secured to the inner bracket which is itself resiliently and removably attached the wheel. Thus, the outer bracket and the cover body is non-rotatable with the wheel, although it is rockable, pendulum-like while the wheel is in motion. Thus the vehicle wheel will rotate, but the cover body will not and therefore will be able to be used as a moving advertisement.

BRIEF DESCRIPTION OF THE DRAWINGS

FIG. 5 is an enlarged view of the holding device by which the inner bracket for the wheel cover is secured to the wheel;

FIG. 6 is a view of the installation of the device shown in FIG. 6 on the wheel;

FIGS. 7 and 8 are views similar to FIGS. 5 and 6 showing another form of holding device.

DESCRIPTION OF THE INVENTION

Figure 1:
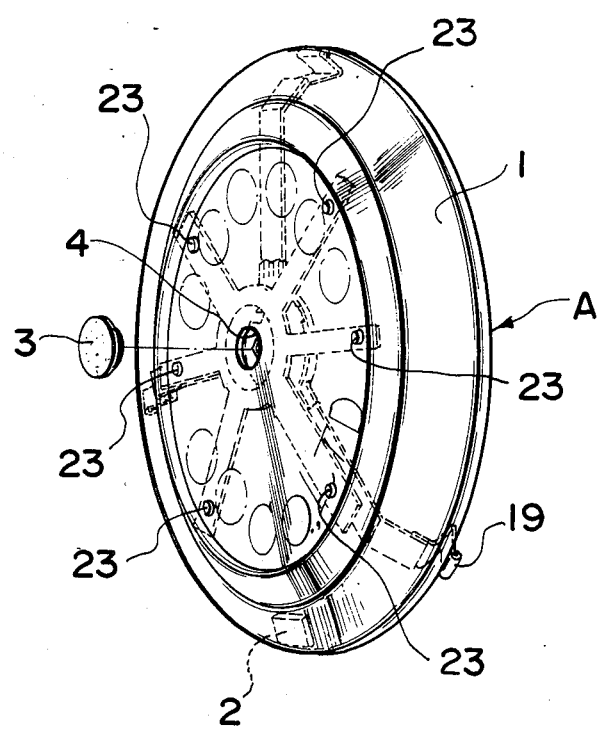
FIG. 1 is an exploded view of the hub cap assembly embodying the present invention.
Figure 2:
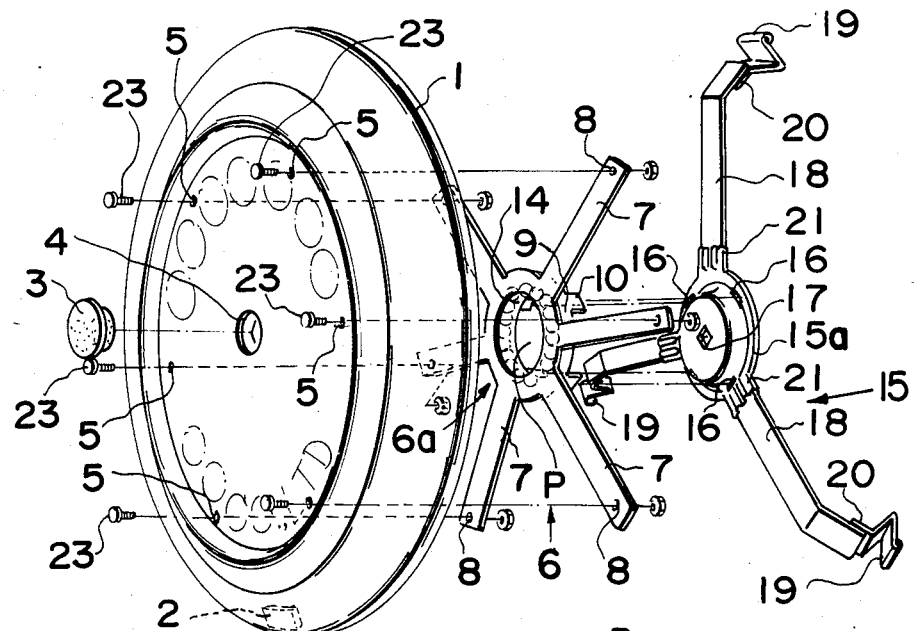
FIG. 2 is an exploded view of the wheel cover and its supporting brackets.

As shown in the drawings, the hub cap assembly is generally referred to by the letter A is applied on a conventional wheel generally referred to by the letter B. The hub cap assembly A comprises a wheel cover 1 on the front surface of which is placed advertising material, design characters, marks and the like. On the back surface of the wheel cover 1 there is secured a weight 2. The hub cap assembly A includes an outer bracket 6 having an annulus P, defining a central hole, and from which radially extend spokes 7. The outer bracket 6 fits over an inner bracket 15a having a central boss 17 from which radially stays 18 extend. The outer end of each of the stays 18 is provided with a V-shaped rim clip 20, the outer tip 19 of which is rounded to form a hollow cylinder. The wheel cover 1 is fixed to the outer bracket 6 which is itself resiliently secured to the inner bracket 15 as will be explained hereinafter. This hub cap assembly A is arranged so that the cylindrical tips 19 at the end of the stays 18 are removably attached to the rim 22 on which a tire 25 is mounted. Incidentally, the wheel cover 1 is of the same shape as the conventional hub cap covers now in use. The wheel cover 1 is however provided with a small central hole 4 into which a cap 3 is ultimately inserted. The wheel cover 1 is provided with holes 5, while the outer bracket 6 is provided with holes 8 through which bolt and nuts 23 can be used to attach the two together.

The weight 2 is attached along the edge of the inside surface 1 at a selected position to establish a center of gravity at a given point so that when the hub cap assembly A is fitted to the wheel B, the wheel cover 1 will rock pendulum-like and will always come to rest in one place.

To mount the hub cap assembly A to the wheel B so that the wheel cover does not rotate with the wheel but rocks, the outer bracket 6 is formed with a central annulus P and radially extending spokes 7 having screw holes 8 at their end. The annulus P is provided with a bearing, comprising a casing 9 having rearwardly extending tabs 10 and in which a ball bearing assembly 11 is located. The bearing assembly 11 comprises a plurality of balls held between an outer race 12 and an inner race 14. The outer race 12 is integral with the casing 9 while the inner race 14 is held securely in the annulus P and is sealed with a waterproof seal 13. In this manner, the spokes 7 on which the wheel cover 1 is carried is fixed to the inner race 14 and thus is rotatable about the axis of the bearing 11 while the outer race 12 is fixed to the casing 9, which is in turn fixed by the extending tabs 10 to the inner bracket 15. The inner bracket 15 is provided with a plurality of locking slots 16 spaced about the central boss 15a into which the rearwardly extending tabs 10 are inserted and bent, as shown by the arrow T (FIG. 4) to hold them fixed. Consequently, connecting the outer race 12 and the casing 9 of the outer bracket 6 to the inner bracket 15.

Figure 4:
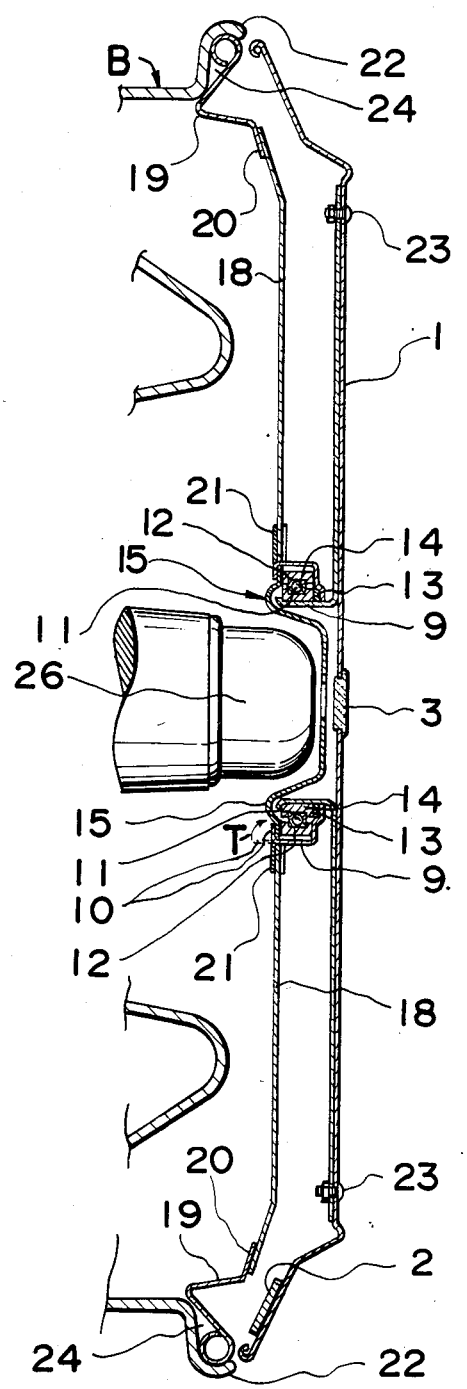
FIG. 4 is an enlarged cross-sectional view of the hub cap assembly of the present invention showing its attachment to a wheel.

The central boss 15a is provided with a polygonal hole 17 in which a wrench L inserted through the central hole 4 of the wheel cover 1 can be inserted and thus the inner bracket 15 can be independently, manually rotated to lock the tip 19 of the rim clip 20 onto the wheel. As seen in FIG. 4, the V-shaped rim clips 20 at the end of the stays 18 of the bracket 15, are cylindrically rounded at tip 19, so that rounded tip 19 can be inserted within a cusp of the rim 22 of the wheel B. Thus, the inner bracket 15 can be resiliently held on the wheel B. A socket-like fitting 21 connects the stays 18 to the central boss 15a, thus securing the stays 18, while permitting their removal or radial adjustment. As seen in FIGS. 1 and 4, the hub cap assembly A is assembled by fixing the wheel cover 1 containing the advertisement to the outer bracket C, by installing the bolt and tightening nuts 23 through the holes 5 of the wheel cover 1 and the holes 8 of the spokes 7 and further inserting the locking tabs 10 into the holes 16 in the inner bracket 15. In this manner, not only is the inner bracket 15 held resiliently to the wheel, but the outer bracket 6 is also resiliently attached to the inner bracket 15.

Now the method of fitting and removing the hub cap assembly tool from the wheel assembly B is explained in detail with reference to FIGS. 3 and 4. First of all, a desired hub cap assembly is prepared and the respective rim clips 20 are inserted into the rims 22 of the wheel 24, the stays 18 being then rotated manually by the use of the wrench L until the rounded tips 19 become firmly inserted and fitted and secured to the rim 22. The hub cap assembly A is safely and positively attached to the wheel B. When it is desired to remove the hub cap assembly the inner bracket 15 is rotated in the reverse direction, also using the wrench L. This will simply cause the rim clips 20 to be released from the rim 22 so that the assembly A can be removed in its entirety. When using the wrench L in the operation, the small cap 3 is removed from the small hole 4 in the wheel cover 1, aferward it is, of course, replaced.

In operation, since the bolts 23 fixes the wheel cover 1 to the rotatable spokes 7 of the outer bracket 6 so they are operatively connected to the innerrace 14, the outer race 12 of the ball bearing 11 is fixed to the inner bracket 15 through the locking tabs 10. Therefore, when the rim clips 20 are inserted at their projecting rounding tips 19 into the cusp 24 of the wheel rim 22, the inner bracket stays 18 will be resiliently, firmly, and non-rotatably secured to the rim 22. By the resilient fitting of the rim clips 20 and the resiliently fitting of the ball bearing assembly 11, the wheel cover 1 will be non-rotatable, relative to the wheel B although it will be rockably fitted to the wheel B, irrespective to the rotation of the wheel. Even if the vibration of the wheel B, while running, is transmitted to the inner bracket 15 through the respective rim clips 20, the impact will be reduced by the ball bearing assembly 11 and the wheel cover 1 held on the bracket 6 will merely rock or remain stationary. Further, as the weight 2 is attached to the wheel cover 1, creating a predetermined center of gravity below the center of rotation of the wheel B, there will always be a downward position of the wheel cover 1 maintaining the wheel cover 1 substantially stationary and in a fixed position even though the wheel rotates. If an advertisement is carried on the surface of the wheel cover 1, this stationary orientation will enable the wheel cover to be easily read and thus utilized as a moving advertising surface.

FIGS. 5 and 6 and 7 and 8 show two embodiments for fitting and removing the hub cap assembly A to the wheel B. In FIGS. 5 and 6, a metal rim clip 27, separate from the stay 18 is employed in place of the above described rim clip 20 which was an integral part of the stay 18. The separate rim clip 27 consists of a metal plate bent into an S-shape. One end of the metal plate is bent into an incomplete cylinder 28 having an open hole 30 which can be resiliently placed over the edge of the stay 18 while the other end of the metal plate is rolled to form a closed cylinder 29 having a bore 31. The cylinder 29 is provided with grooves 29a restricting the inner surface of the cylindrical bore 31. A male companion locking pin 32 having an enlarged sleeve 33 at one end, capable of being securely fitted beneath the rim 22 of the wheel is provided. The locking pin has a groove 34 at its forward end adapted to mate with the groove 29a when inserted within the cylindrical hole 30. The enlarged shaft 22 is fixedly inserted beneath the rim 22 of the wheel B and securely held in place, whereby the stays 18 can be rotated, as previously described, causing the bore 31 to move over the pin 32 until the grooves 29a and 34 engage. In use, the rim clip 27 is fitted to the tip of the inner bracket and because of the spring action of the incomplete cylinder and the engagement of the grooves 29a and 34, the two will be firmly locked together and the inner bracket thus completely connected to the wheel B, for the purposes earlier described.

Figure 3:
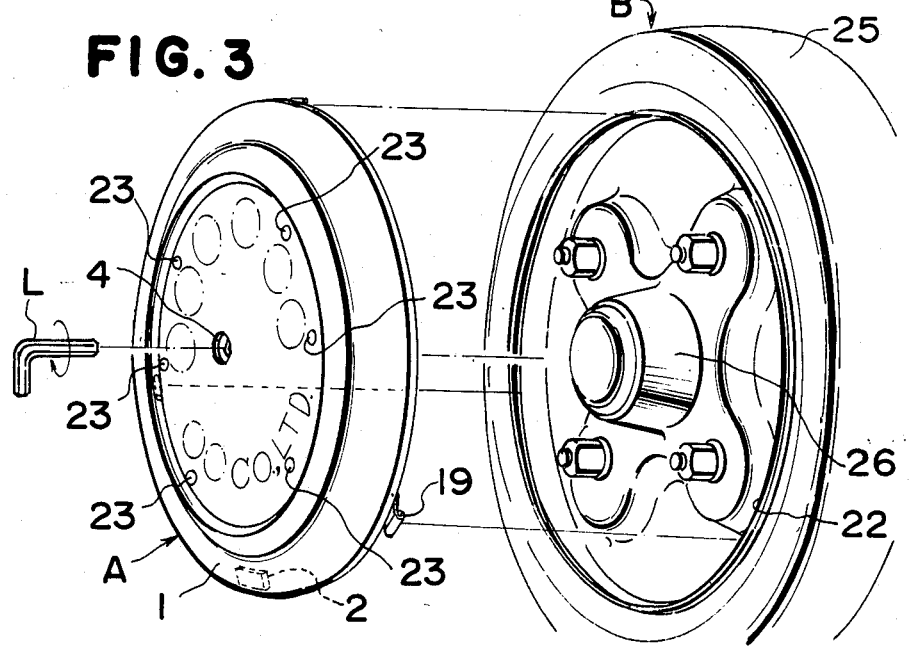
FIG. 3 is an enlarged perspective view illustrating the method of fitting and removing the hub cap assembly of the present invention to and from a wheel.

The embodiment shown in FIGS. 7 and 8 is similar to that of FIG. 3 in that it consists of the same rim clip 27 having an open cylinder 28 provided with the hole 30 which can be removably fit over the end of the stay 18 and the closed cylinder 29 having the bore 31. A similar locking pin 32 is also employed, however, as seen in this embodiment, the locking pin 32 and the sleeve 33 are separable. The locking pin 32 is inserted at its rear end directly into the hole 31 of the closed cylinder 29 with its pointed end directed to the sleeve 33, which is fixed as indicated earlier, in the cusp of the rim 22. In this case, the sleeve 33 is provided with the inwardly directed groove restricting its interior bore. In this embodiment, rotation of the bracket 6 as described earlier causes the pin 32 to move into the sleeve 33 rather than in the reverse direction as shown in FIGS. 5 and 6.

I claim:

1. A hub cap assembly for a vehicular wheel having a curved peripheral rim, comprising a wheel cover having on its front surface advertising material or other indicia and on its back surface a weight, an outer bracket comprising a central annulus from which radially extends a plurality of spokes to the free ends of which the wheel cover is attached, an inner bracket comprising a central boss from which radially extends a plurality of stays and a ball bearing assembly located within the central annulus of said outer bracket and having one race fixedly connected thereto and its other race fixedly connected to the central boss of said inner bracket, each of stays of said inner bracket having at their free ends a V-shaped clip having a rounded tip adapted to be inserted within the rim of the vehicular wheel to resiliently secure said inner bracket to said wheel for conjoint rotation therewith and independently of said outer bracket and weighted wheel cover.

2. The assembly according to claim 1 wherein said weight is applied to said wheel cover to provide said wheel cover with a center of gravity causing said wheel cover to rock about the axis of said bearing.

3. The assembly according to claim 2 wherein the bearing assembly includes a casing, said casing being integral with said other race, and having a plurality of axially extending tabs, and wherein the boss of said inner bracket is provided with a plurality of slots, said slots being adapted to receive and secure therein said extending tabs.

4. The assembly according to claim 3 wherein said wheel cover is provided with a hole through which a polygonal shaped wrench is insertable, and said inner bracket is provided with a conformingly shaped socket whereby said inner bracket may be rotated relative to the wheel to insert the rounded tip of said V-shaped clip in the rim thereof.

5. The assembly according to claim 4 wherein the rounded tip of said V-shaped clip comprises an S-shaped retainer having hollow cylindrical clamp members at each end, one of said clamp members being secured over the free end of said stay and the other one of said clamp members being aligned with the rim of the wheel, a pin fixedly secured in the rim of said wheel in alignment with the other clamp, said pin and said other clamp being provided with cooperating locking grooves whereby on rotation of said inner bracket said pin is insertable within said other clamp to fixedly join said stay and said wheel.

6. The assembly according to claim 4, wherein the rounded tip of said V-shaped clip comprises an S-shaped retainer having hollow cylindrical clamp members at each end, one of said clamp members being secured over the free end of said stay and the other one of said clamp members being aligned with the rim of the wheel, a pin fixedly secured in the other clamp member and a sleeve fixedly secured in the rim of said wheel in alignment with said pin, said pin and said sleeve being provided with cooperating locking grooves whereby on rotation of said inner bracket said pin is insertable within said sleeve to fixedly join said stay and said wheel.

* * * * *